SINGLE PERSON SHELL AND METHOD

Filed March 18, 1969

5 Sheets-Sheet 1

INVENTOR.
WILLIAM D. WURZBERGER

BY

Strauch, Nolan, Neale, Nies & Kurz
ATTORNEYS

INVENTOR.
WILLIAM D. WURZBERGER

BY

Strauch, Nolan, Neale, Nies & Kurz
ATTORNEYS

Oct. 12, 1971 W. D. WURZBERGER 3,611,461

SINGLE PERSON SHELL AND METHOD

Filed March 18, 1969 5 Sheets-Sheet 3

INVENTOR.
WILLIAM D. WURZBERGER

BY

Strauch, Nolan, Neale, Nies & Kurz
ATTORNEYS

INVENTOR.
WILLIAM D. WURZBERGER

BY

Strauch, Nolan, Neale, Nies & Kurz
ATTORNEYS

INVENTOR.
WILLIAM D. WURZBERGER
BY
Strauch, Nolan, Neale, Nies & Kurz
ATTORNEYS

United States Patent Office 3,611,461
Patented Oct. 12, 1971

3,611,461
SINGLE PERSON SHELL AND METHOD
William D. Wurzberger, 922 Tyson St., Baltimore, Md. 21201
Filed Mar. 18, 1969, Ser. No. 808,191
Int. Cl. B63b 3/02
U.S. Cl. 9—6 33 Claims

ABSTRACT OF THE DISCLOSURE

A slim, single person rowing shell made with sheet plastic hull, decks and rigid molded plastic cockpit, sealed together as a water-tight semi-hollow body. The hull and decks are vacuum formed and the cockpit is expansion cast. Buoyant plastic material enclosed in the body renders the shell substantially sink-proof. A uni-piece cockpit can include integral bracing which provides the requisite outrigger support structure for oars and auxiliary pontoons. Various structures are contemplated as alternate outrigger supports, some being made from integral plastic parts of the cockpit structure or metal tubing secured as truss structure to the cockpit rim.

BACKGROUND

This invention relates to small plastic boats, for example, a single type rowing shell or the like, which can be used for exercise, pleasure, or sports competition.

Single rowing shells are well known and quite expensive, primarily being constructed with wooden hulls, decks, and cockpit structure, and recently, fibre glass hull shells have appeared on the market.

SUMMARY OF THE INVENTION

A primary object of the present invention resides in the provision of a small, slim water-tight boat, such as a single person rowing shell, constructed primarily of molded plastic, fitted together to provide a water-tight hollow body.

A further object resides in providing a plastic shell comprising a single piece molded sheet plastic hull, two sheet plastic deck pieces, and a unitary rigid plastic cockpit structure fitted and sealed together to form a water-tight body. In conjunction with this object, further objects reside in providing several alternative outrigger structures for supporting oarlocks, such outrigger structures being integral with or separable from but secured to the rigid cockpit structure. Still other objects include the utilization within this hollow body of buoyant plastic material disposed fore and aft of the cockpit structure. Still further objects reside in the provision of supplemental outrigger structure enabling incorporation of small pontoon bodies which, for convenience, will be termed training pontoons.

Still another object resides in the novel method of making a plastic boat by vacuum forming a hull, a fore deck and an aft deck from plastic sheet material, spin casting a cockpit and intermediate rail structure from plastic and bonding all parts with a plastic bonding agent in a body with watertight compartments.

BRIEF DESCRIPTION OF THE DRAWINGS

Further novel features and other objects of this invention will become apparent from the following detailed description, discussion and the appended claims taken in conjunction with the accompanying drawings showing a preferred structure and embodiment in which:

DETAILED SPECIFICATION

Figures 1, 2, 3, 4:
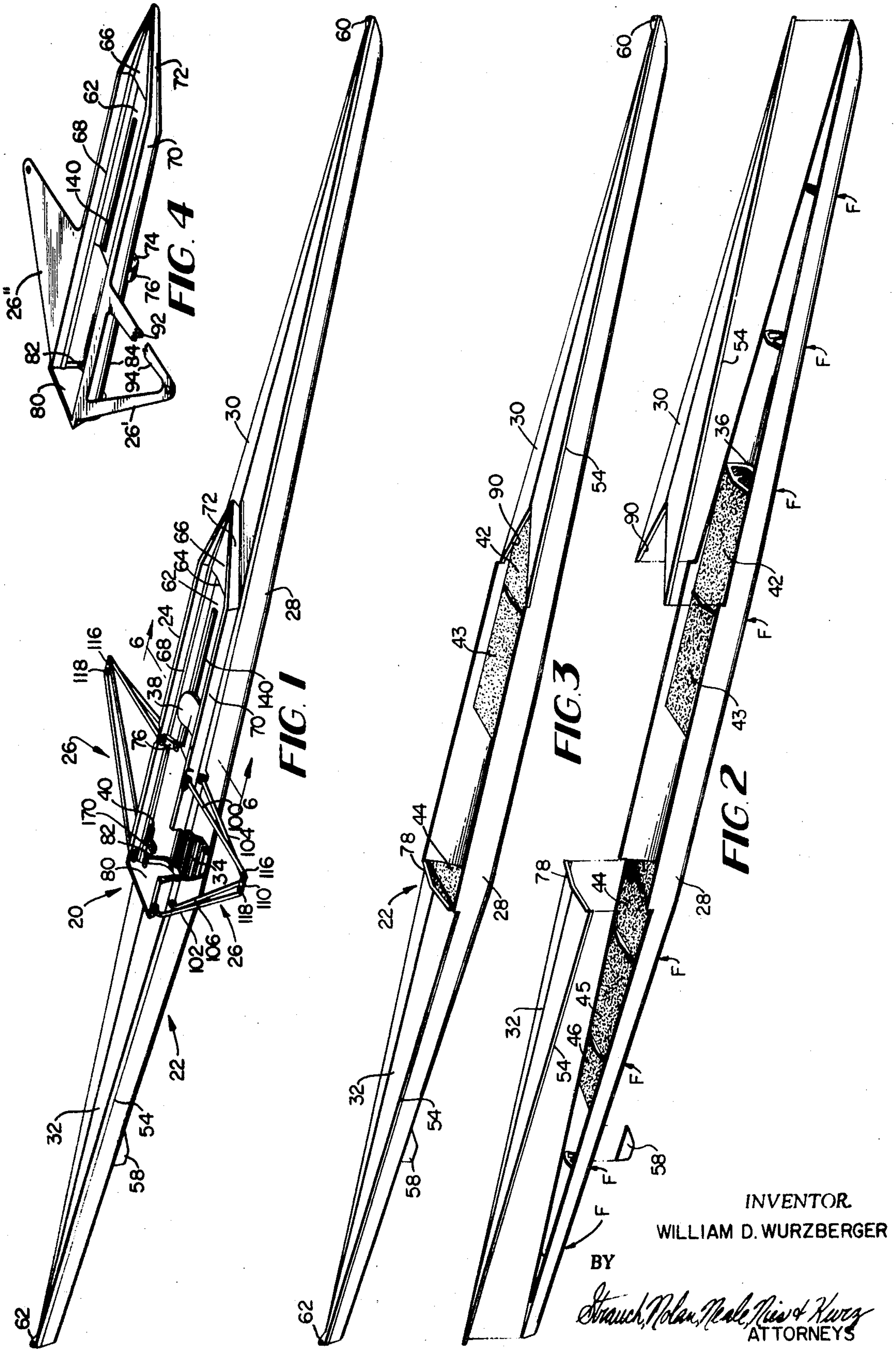
FIG. 1 is a perspective view of a single rowing shell constructed in accordance with the principles of the present invention, the illustrated cockpit oarlock outriggers being a preferred type of outrigger structure.
FIG. 2 is an exploded view of the shell without the cockpit, showing various structural components including the single piece hull, foam plastic material being disposed in several places within the hull under the fore and aft decks.
FIG. 3 shows the assembled parts of the body of the rowing shell, which are depicted in FIG. 2, also minus the cockpit structure.
FIG. 4 is a composite perspective of the unitary cockpit structure which has been pictorially modified to show two different styles of integrally molded plastic outrigger structures extending from the rim of the cockpit.

With reference to the drawings, an assembled single shell 20 is shown in FIG. 1, major components and subassemblies are shown in FIGS. 2, 3 and 4 and details of construction are shown in FIGS. 5–15. Looking initially at FIGS. 1–3, the shell 20 has a long, slim body 22 containing a preformed cockpit structure 24 which fits into and is secured to the body, as will hereinafter be described, providing rigidity and strength at the mid-section of the shell. FIG. 1 includes a preferred form of outrigger structure 26, one on each side of the cockpit portion and secured to cockpit 24 and body 22. Cockpit 24 also includes seating provision for one person. Details of cockpit 24 will be hereinafter more fully described.

FIG. 4 shows the unitary preformed cockpit 24' and is a composite drawing showing two different alternate types of outrigger structure 26' and 26'' which are formed as integral parts of the cockpit.

As shown in the exploded view of FIG. 2 the hull 28, fore deck 30 and aft deck 32 are each made from a single piece of sheet plastic. Shown in FIG. 1, where the side of the hull and cockpit is broken away, is a corrugated sheet doubler 34 serving as the floor of the cockpit 24, and a similar corrugated sheet doubler 35 (see FIGS. 5 and 6) is located in the bay under the cockpit seating area. At each location marked F in FIG. 2, a bulkhead or frame such as shown at 36 is bonded to the hull and correlated part of the associated deck or cockpit.

The hull 28, deck parts 30 and 32, frames 36 and corrugated sheet doublers 34 and 35 are made from sheet plastic and a preferable construction found satisfactory is that such parts be vacuum moulded from thin (e.g. .063″) extruded sheet ABS "Cycolac" Type DH. The cockpit 24 and other detail components such as the seat 38 and foot board brackets 40 may be made from suitable plastics, one satisfactory way is that such parts be expansion cast from ABS "Cycolac" Type JS.

While other plastics with similar qualities may be used, the ABS (acrylonitrile-butadiene-styrene) thermoplastic polymers which, particularly in extruded sheet form, are tough, hard and rigid are very satisfactory materials of construction, offering many desirable characteristics such as: high degree of rigidity; medium to high impact strength; good tensile, compression and flexural strengths; heat resistance; a hard, smooth surface; dimensional stability, corrosion resistance; and ease of processing.

Located fore and aft of the cockpit area are masses of buoyant plastic 42, 43, 44, 45, 46 suitably shaped to fit in the hull near the cockpit area. In the exemplary shell (see FIG. 10) which has a length of approximately 26 feet, beam of approximately 14 inches and depth of approximately 7 inches, 1½ cubic feet of urethane foam (2#/cu. ft. density) can be divided equally fore and aft to provide a more than sufficient buoyancy safety factor for a full grown man should the hull be ruptured. In the exemplary shell body plan of FIG. 10, the stations are 2½ feet apart excepting that station O is 1½ feet from the bow.

The frames 36 are assembled in hull 28, foam plastic sections 42–48 are inserted or pumped into place and the two decks 30 and 32 assembled over the hull. The various plastic parts, i.e., the frames, hull, decks and foam plastic are secured by using a suitable bonding solvent or epoxy compound, whichever is more convenient for the joint involved. MEK peroxide solvent is one solvent suitable for use with the "Cycolac" plastic parts. Note: before the foam plastic block 43 is assembled the seat area corrugated sheet doubler is bonded to the inside of the hull.

Figure 19:
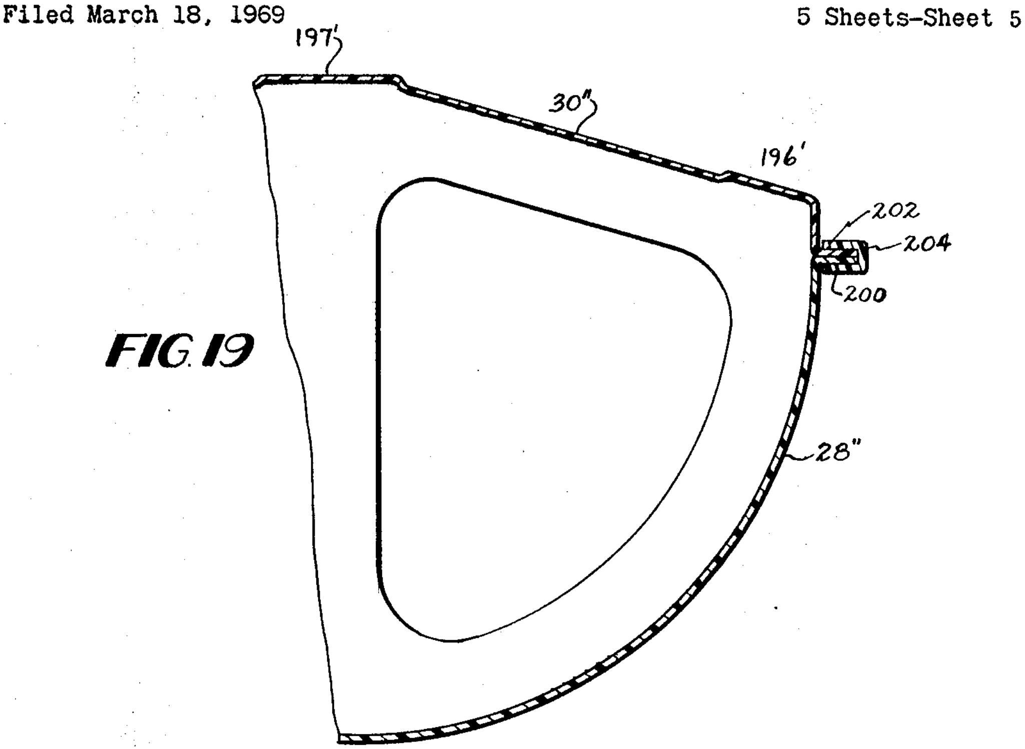
FIG. 19 is an enlarged detail section view showing a deck contour similar to FIG. 18, but illustrating a modified joinder structure between the deck pieces and the hull.

When the hull 24 is formed, the top side edges 50 (see FIG. 7) to which the decks are secured are provided with a 1/16″ offset 52 about ¾″ wide and the edges of the decks 30 and 32 have depending flanges 54, slightly wider than ¾″, which fit over and extend slightly past the hull edge offsets 52. When the deck flanges 54 are bonded to the hull edge offsets 52 the bond tends to provide an effective interlock 56 between the flange edge and the lower edge of the hull offset. An alternative and more economical construction is shown in FIG. 19 and will be hereinafter described.

A small fin 58 made from heavy sheet plastic suitably contoured is epoxy bonded to the bottom of the hull at about ⅗ of the distance between the cockpit and the stern. Similarly, suitably shaped mooring eyes 60 and 62 made from heavy sheet plastic are secured to the deck at prow and stern.

FIG. 3 illustrates the assembled body 22, as just described, before the cockpit 24 is installed. The cockpit embodiment 24 seen in FIG. 1 is installed before the outrigger structure 26 is assembled. Alternatively, cockpits constructed with integral plastic outriggers such as 26′ or 26″ seen in FIG. 4, are assembled in ready condition. Whichever type of cockpit outrigger structure is desired, the remaining portion of cockpit structure in each of the embodiments is similar, being constructed of rigid plastic with thick walls, details of which will now be described with reference to FIGS. 1, 4, 5 and 6.

Cockpit 24 has a seat support deck 62 which merges forward with a short upstanding wall 64 which integrally joins to a small V-shaped deck 66. Integral with the sides of the seat deck 62 are the cockpit gunwales 68 and 70 which extend forward to a convergent spray deflector 72. At the aft end of the seat deck 62 is an integral depending imperforate bulkhead 74 with a rigid flange 76 around its outer edge contoured to fit into the hull 28. The seat deck 62, front wall 64, deck 66, spray deflector 72, adjacent portions of the cockpit gunwales 68 and 70 and bulkhead 74 are integral and imperforate.

The cockpit gunwales 68 and 70 extend aft to the upturned forward edge flange 78 of the stern deck 32 and terminate in an integral combined rear cockpit wall and imperforate bulkhead 80. Bulkhead 80 has an integral heavy flange 82 (see FIG. 1) contoured to fit the inside of the hull. The lower edges 84 of the cockpit gunwales 68 and 70 are reinforced and slotted fore and aft as shown at 86 and slip down over the offset top edges 84 of the hull 28 between the forward deck and the stern deck. All joints between the cockpit 24 and body 22 are secured by solvent bonding or epoxy compound, the flanges 76 and 82 being secured to the hull, the gunwale slots 86 being secured to the hull top edges, cockpit after wall being secured to the upturned flange 78 on the stern deck and the cockpit spray deflector 72 being secured to the after downturned flange 90 of the forward deck. The cockpit corrugated doubler 34 can then be installed and secured.

When the cockpit 24 is secured to body 22 in such a manner the shell has two water tight hollow compartments a portion of each enclosing the aforedescribed plastic foam material 42–46.

If the outriggers are integral with the cockpit as shown in FIG. 4, the plastic outrigger structure includes integral strengthening ribs, preferably on the under side, such as rib 92 on strut 94 shown in FIG. 4. The solid outrigger 26″ can include several convergent ribs. Oarlock apertures 96 are located at the outer extremities of the outriggers.

Alternatively to the integral plastic outriggers of FIG. 4, the outriggers can be assembled from tubes which can be made from plastic or a corrosion resistant metal as shown in FIGS. 1, 5, 11 and 12. The tubular outriggers 26 are complementary in shape and only one will be described. Outrigger 26 is made from four pieces of metal tubing 100, 102, 104 and 106 joined together and secured to the cockpit 24 and body 22 in the manner of a truss. Seen in FIGS. 11 and 12, the two upper tubes 100 and 102 have flattened ends welded at 108 and 109 to an oarlock reception plate 110. The two lower tubes 104 and 106 have flattened apertured ends 112 and 114 which underlie the plate 110 adjacent the forward upper tube 100 and are rigidly fastened to the plate by a bolt and nut assembly 116. The plate 110 is apertured at 118 to accommodate an oarlock.

Figures 5, 6, 7, 8, 9, 13:
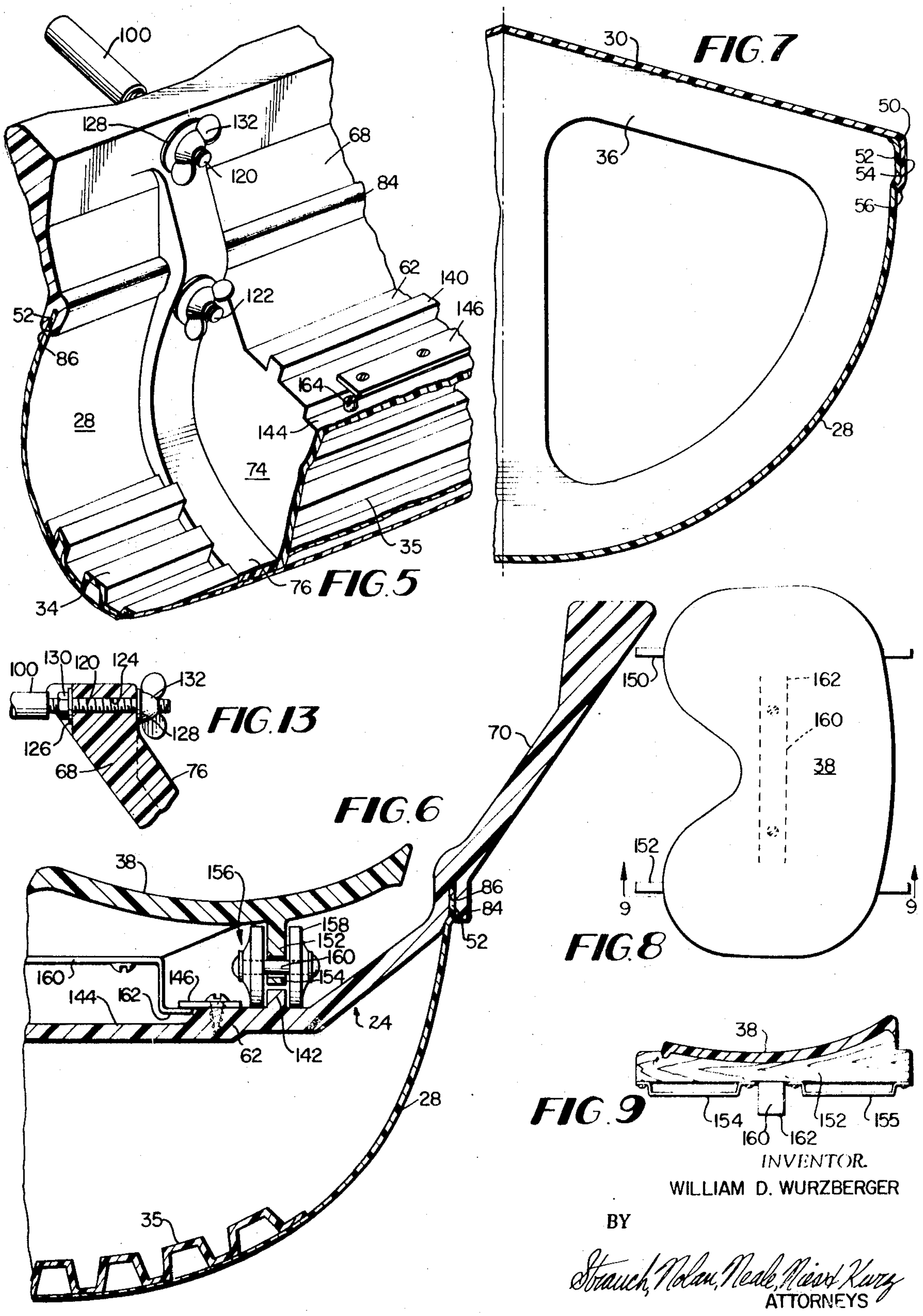
FIG. 5 is an enlarged detail view showing various structural aspects of the cockpit as assembled to the hull.
FIG. 6 is an enlarged cross-section detail taken on line 6—6 of FIG. 1 and shows the heavy molded construction of the cockpit seat support platform as well as some details of the sliding seat.
FIG. 7 is an enlarged detail view taken transverse of the shell showing one of the body bulkheads or frames.
FIG. 8 is an enlarged plan view illustrating the sliding seat structure.
FIG. 9 is a section view taken on line 9—9 of FIG. 8 illustrating the roller retaining brackets secured to one of the seat support struts.
FIG. 13 is an enlarged detail view of a tube connection to the shell and is included on drawing sheet #2 with FIG. 5.
Figure 10:
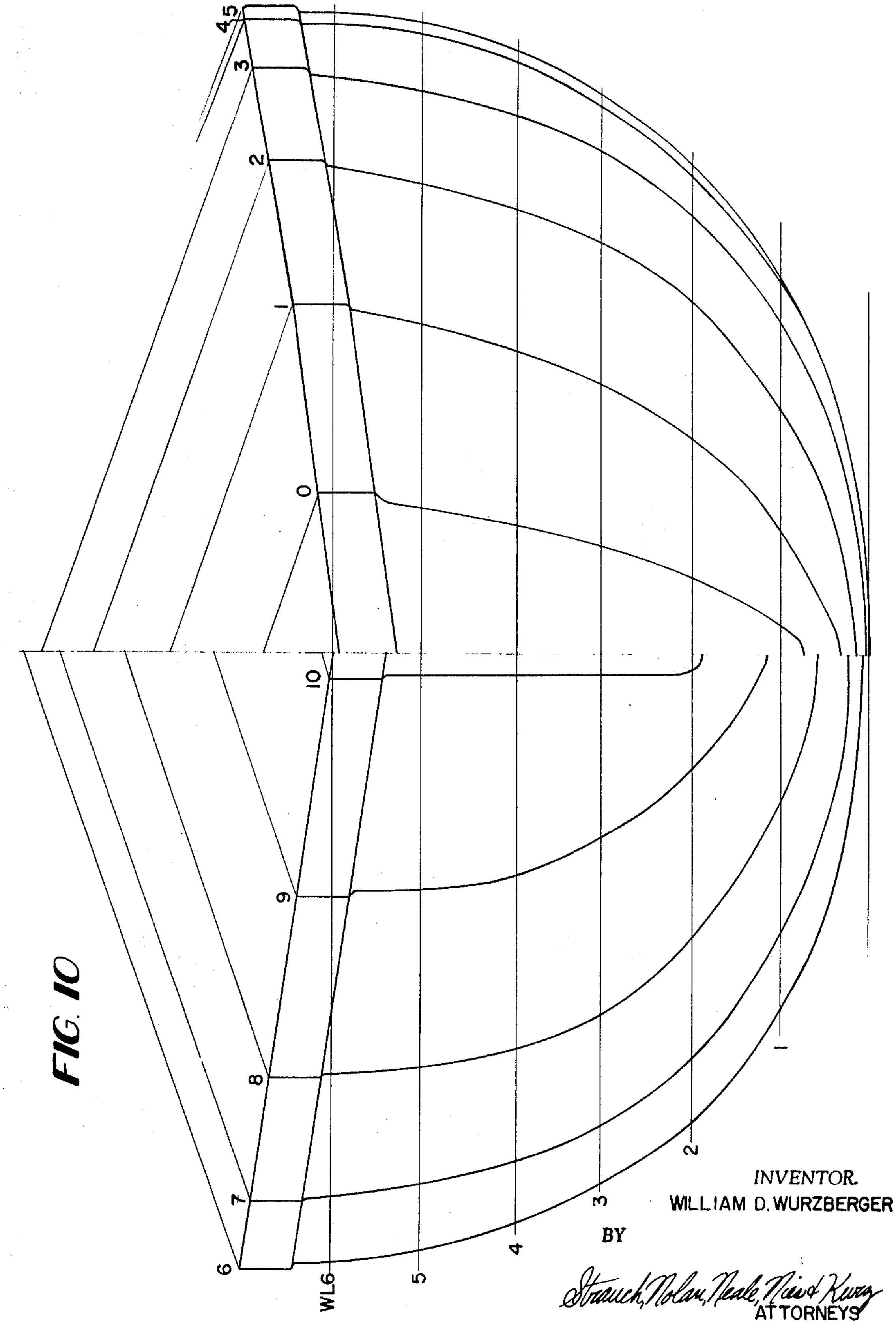
FIG. 10 illustrates the contour lines and offsets of the body plan of an exemplary shell taken from the actual marine drawings in which the maximum beam is 14 inches.
Figure 11:
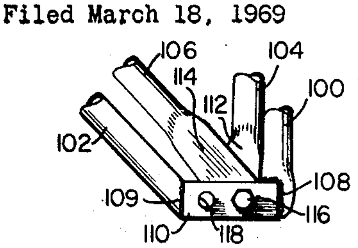
FIGS. 11 and 12 are enlarged detail plan and side views respectively of the oarlock retaining ends of the tubular outrigger assemblies seen in FIG. 1.
Figure 12:
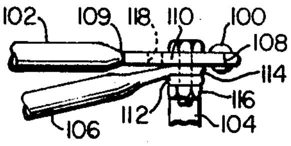

Turning now to FIGS. 1 and 5, all of the tubes 100–106 have threaded studs, e.g., 120, 122 suitably secured as by welding at the tube ends which fasten to the body 22. The threaded studs on the two upper tubes 100 and 102 (see FIG. 13 on sheet #2) fit through apertures 124 in the heavy reinforced upper edges of the cockpit gunwale 68 (or 70) and are rigidly secured by washers 126 and 128, a nut 130 and a wing nut 132. Shown in FIG. 5, the lower tubes 104 and 106 are similarly secured, excepting their studs project through aligned apertures in the hull and the reinforcing flanges 76 or 82 (the latter being shown in FIG. 1).

Nuts 116 and 130 are preferably of the self-locking type, e.g., lock nuts with small nylon inserts, and the wing nuts 132 similarly can be of the self-locking type.

Extending the length of the seat deck 62, and integrally molded therewith, are spaced apart upstanding seat tracks 140 and 142 located near the sides of the deck. The central longitudinal part of the seat deck at 144 is depressed and enables inclusion of a seat retention structure formed by flat metal strips 146 screwed on the seat deck adjacent the depression with an edge portion of the strips 146 overhanging the deck depression 144.

The under side of sliding seat 38, made from plastic, as aforedescribed, has two integral depending support struts 150 and 152 disposed fore and aft and spaced apart a distance equal to the seat tracks 140 and 142. Two roller retaining brackets 154 and 155 are secured to the bottom of each seat strut and provide slotted retainers for four roller sets 156, one of which is shown in FIG. 6. Each roller set has two wheels 158 made from a tough plastic, such as "Cycoloy" 800, joined by a press fit axle 160. The wheel sets roll along the seat deck on opposite sides of the associated track and are kept loosely in assembly with seat 38 by the brackets 154 and 155.

A seat retaining bracket 160, made from a metal strap, is screwed to the under side of the seat 38, is disposed laterally of the seat, and has depending bent ends 162 disposed under the seat retaining strips 146. The strips 146 can be secured after the seat is installed. To prevent the seat from rolling off the aft end of seat deck 62, a small stop 164 (FIG. 5) can be secured by a screw under the aft end of the overhanging edge of each strip 146.

A foot board 170 (FIG. 1), which can be plastic or wood, is secured to foot board brackets 40, which are plastic blocks fastened by bonding to the cockpit enclosure. If desired sandal-like foot stirrups can be secured to the foot board 170.

The described single person shell is symmetrical about a longitudinal center line and, as is the nature of shells, has a narrow beam, pointed prow and stern and is very long and narrow. An exemplary set of body plan lines and offsets for a shell in accord with the invention is included as FIG. 10 of the drawing.

Figure 14:
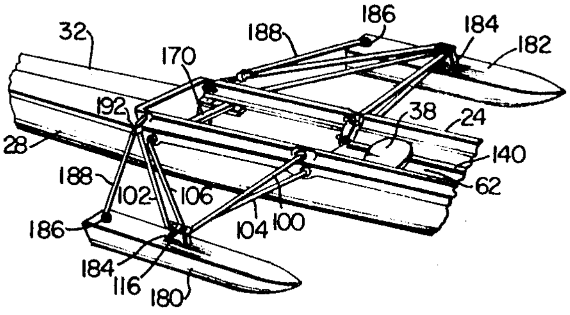
FIG. 14 illustrates attachment of auxiliary outrigger training pontoons on the ends of the outrigger structure.
Figure 15:
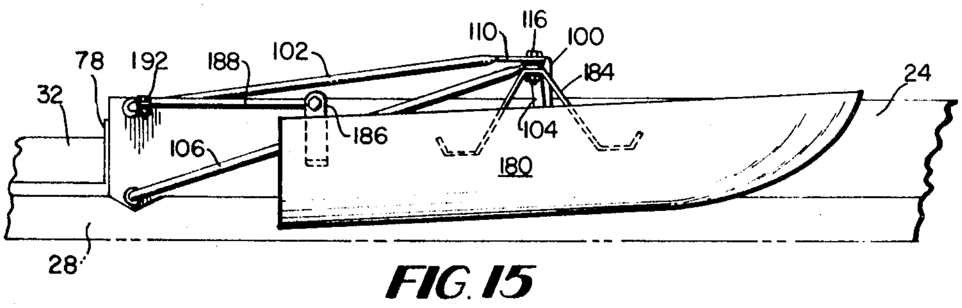
FIG. 15 is an enlarged side view of the training pontoon illustrating details of the attachment fittings.
Figures 16, 17:
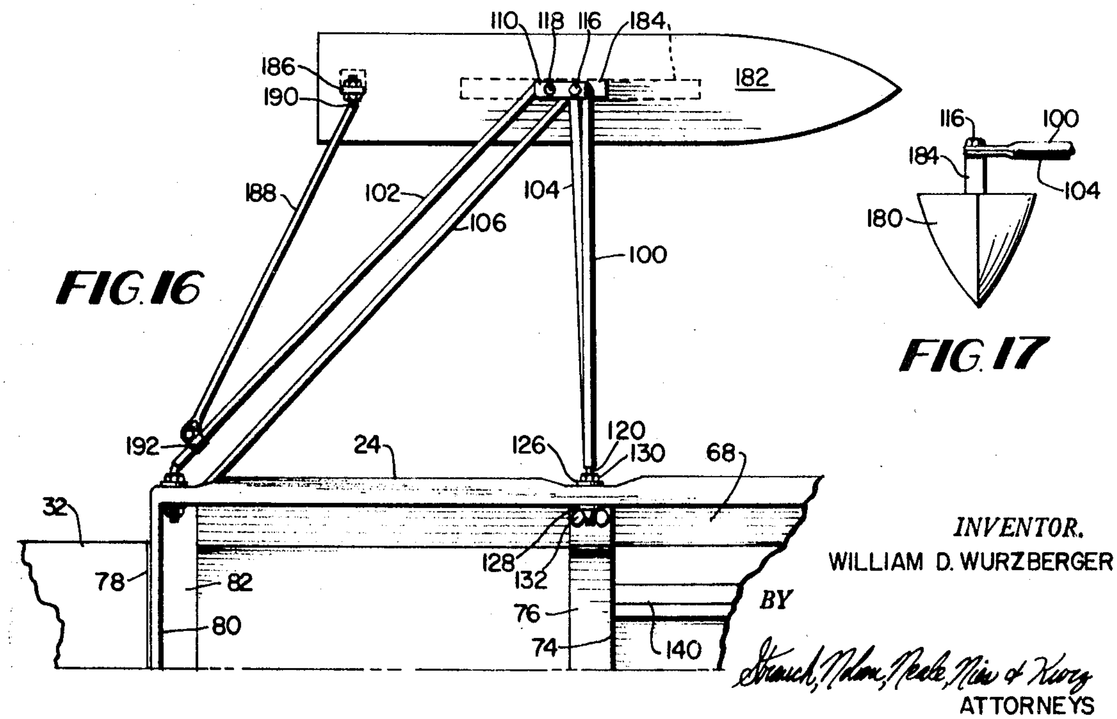
FIG. 16 is an enlarged plan view of the structure seen in FIG. 15.
FIG. 17 is a detail front view of one of the training pontoons.

For any person inexperienced in operating a shell, provision can be readily made for attaching auxiliary training pontoons to the oarlock outriggers. FIG. 14 shows training pontoons 180 and 182 secured to outriggers 24. The pontoons 180 and 182 can be inexpensively molded from foam plastic, such as 2–4#/cu. ft. polyurethane foam. Each pontoon has two support brackets 184 and 186 embedded in the plastic during molding. The upper portion of bracket 184 is apertured and is secured under the oarlock retaining plate 110 by means of the existing bolt and nut assembly 116. An auxiliary tube strut 188 with a threaded stud 190 is fastened at one end to pontoon bracket 186 and has its other end flattened and apertured and connected by a bolt and nut to a clamp 192 around the tubular strut 102 closely adjacent the shell cockpit.

The two pontoons 180 and 182 will be just above the water line and have a few degrees of positive inclination.

Figure 18:
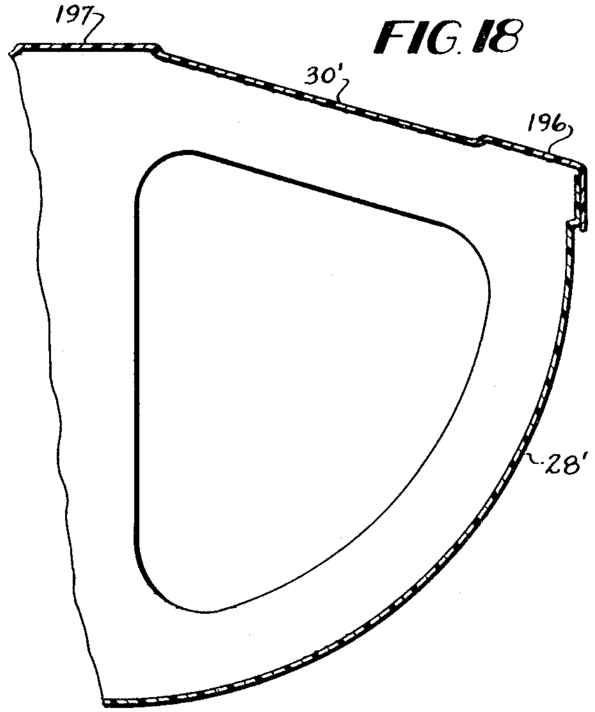
FIG. 18 is an enlarged detail section somewhat like FIG. 7 but illustrating a modified deck contour.
Figure 20:
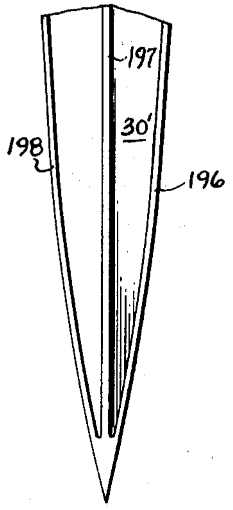
FIG. 20 is a detail top plan view showing a small part of the bow to illustrate upward offsets in the deck serving as integral strengthening ribs.

An alternative deck contour is shown in FIGS. 18, 19 and 20 where the decks 30′ and 30″ shown on respective hulls 28′ and 28″ include upstanding offsets 196, 197 and 198 (196′ and 197′ in FIG. 19) providing effective longitudinal rib formations which help maintain the deck shape.

An alternative structure for the joint between the two major deck pieces and the hull is shown in FIG. 19 where the top side edge of the hull 28″ where it meets the deck 30″ has an outwardly directed flange 200 which is abutted by similar outwardly directed flange 202 along the side edges of the fore and aft deck pieces exemplified by deck 30″. The mating flanges 200 and 202 are suitably bonded and a channel shaped piece of flexible plastic 204 (such as vinyl) placed over the flange joinder and secured by suitable bonding. One continuous channel strip 204 can extend around the forward deck flange and another channel strip can extend around the aft deck flange, an end of each channel piece 204 abutting the cockpit structure on each side. Such a construction avoids the close tolerance required of the FIG. 7 hull to deck joinder construction and the channel strips 204 provide an effective bumper.

A single person shell in accord with this invention is capable of mass production techniques, and provides a unique water sport item with desirable safety aspects, a unit which can be used for exercise, pleasure, and competition, and, moreover, the structure is adaptable to many versatile uses. For example, it can be equipped with an outrigger to form an outrigger canoe, or it can be equipped with a sail, dagger board keel and rudder and thereby be converted to a single person sail boat.

What I claim and desire to secure by United States Letters Patent is:

1. A watertight boat comprising: a slim shallow single piece hull; at least two major deck portions constituting fore and aft decks, each made from a single piece of material independently of said hull; a cockpit structure; said hull; deck pieces and cockpit structure being made from plastic; joining means securing said deck pieces to said hull in a watertight manner with the major deck structure disposed above the hull edges; joining means securing said cockpit structure to said hull and to said deck pieces in a watertight manner; and portions of each of said cockpit structure, said hull and said deck portions cooperating to provide separated fore and aft compartments; said joining means so cooperating with said hull, said deck portions and said cockpit structure to make said fore and aft compartments sealed and watertight.

2. A water tight boat as defined in claim 1, wherein plastic frames are provided at multiple stations along the length of said hull; joining means secure said frames to said hull and associated deck portions; and foam plastic is provided in said hull substantially equally disposed fore and aft of said cockpit structure and shaped to fit between several successive ones of said frames.

3. A water tight boat as defined in claim 1, wherein said cockpit structure is a single unitary plastic structure and includes a rigid seat deck, fore and aft imperforate bulkheads, heavy rigid side rail gunwales and provision on the lower portion of said gunwales to enable a snug embracing interfit with the adjacent top edge portions of said hull.

4. A water tight boat as defined in claim 3, wherein heavy plastic rig structures, integral with said cockpit structure, adjoining each of said cockpit bulkheads, are formed to abut the hull contour and the abutment areas between said rib structures and said hull are sealed by said joining means.

5. A water tight boat as defined in claim 3, wherein the length to beam ratio is at least 12:1 and rigid outrigger structure is provided, extending from each side of said cockpit structure.

6. A water tight boat as defined in claim 5, wherein provision is made in each said outrigger structure for reception of an oarlock.

7. A water tight boat as defined in claim 6, wherein auxiliary training pontoons are provided and each outrigger structure includes means for securing the associated training pontoon in operative assembly.

8. A water tight boat as defined in claim 7, wherein each said pontoon is molded from foam plastic and has imbedded therein at least two rigid attachment brackets; and at least two attachment means, separately fastened on said two brackets, secure each pontoon to its associated outrigger structure.

9. A water tight boat as defined in claim 5, wherein each outrigger structure includes at least three rods structurally independent of said unitary cockpit structure and plural fastening means rigidly secure one end of all said rods of each outrigger structure to said cockpit structure at widely spaced apart locations in a triangular pattern and other fastening means rigidly secure the other ends of all said rods of each outrigger structure in closely adjacent arrangement.

10. A water tight boat as defined in claim 5, wherein each outrigger structure is an integral part of said single unitary cockpit structure.

11. A water tight boat as defined in claim 9, wherein a plurality of plastic frames are disposed at spaced intervals along the length of said hull under the fore and aft decks.

12. A water tight boat as defined in claim 11, wherein a small fin made from thick rigid plastic is secured under the hull near the aft end.

13. A water tight boat as defined in claim 12, wherein the length to beam ratio is substantially 22:1, and the boat is a single person shell; said cockpit structure includes a seat deck with integral sliding seat tracks; a seat is provided and includes means enabling fore and aft shift of said seat along said tracks.

14. A single shell as defined in claim 13, wherein relatively shiftable interlock means secure said seat to said seat deck while enabling freedom for fore and aft shifting of said seat.

15. A single shell as defined in claim 13, wherein the means which enable fore and aft shifting of said seat includes plastic wheels mounted on the underside of said seat.

16. A single shell as defined in claim 13, including foot rest means connected to said cockpit structure.

17. A water tight boat as defined in claim 1, wherein the top side edges of said hull have offset flanges along the joinder to said major deck portions and said major deck portions have side edge flanges which match and are disposed to overlay said hull offset flanges, and, together with said joining means, comprise an effective interlocked joinder between said deck portions and said hull.

18. A water tight boat as defined in claim 17, wherein said hull offset flanges are vertically disposed and said deck portion flanges are dependent and fit down over said vertical hull flanges.

19. A water tight boat as defined in claim 17, wherein said hull offset flanges are laterally disposed, said deck flanges are laterally disposed, and said joining means which interlocks said matching adjacent flanges includes a plastic channel strip means embracing said matching adjacent flanges and bonding means fastening said adjacent flanges and said channel strip means together.

20. A water tight boat as defined in claim 1, wherein said major deck portions include as structurally integral portions, a plurality of formed raised embossment ridges extending fore and aft.

21. A water tight boat as defined in claim 1, wherein said hull and said deck portions are made from at least a medium impact ABS extruded sheet plastic; and said cockpit structure is made from ABS plastic as a single rigid unit.

22. A water tight boat as defined in claim 1, wherein said hull and said deck portions are made from "Cycolac" Type DH plastic and said cockpit structure is made from "Cycolac" Type JS expandable ABS suitable for expansion casting.

23. A water tight boat as defined in claim 1, wherein said cockpit structure includes a rigid seat deck, fore and aft imperforate bulkheads, rigid side rail gunwales and provision on said gunwales to enable a snug embracing interfit with adjacent portion of said hull.

24. A water tight boat as defined in claim 1, wherein the length to beam ratio is at least 12:1 and rigid outrigger structure is provided, extending from each side of said cockpit structure.

25. A water tight boat as defined in claim 24, wherein each outrigger structure includes at least three rods structurally independent of said unitary cockpit structure and plural fastening means rigidly secure one end of all said rods of each outrigger structure to said cockpit structure at widely spaced apart locations in a triangular pattern and other fastening means rigidly secure the other ends of all said rods of each outrigger structure in closely adjacent arrangement.

26. A water tight boat as defined in claim 24, wherein each outrigger structure is an integral part of said single unitary cockpit structure.

27. The method of making a boat comprising the steps of: vacuum molding a hull from a single sheet of plastic with edge flanges; vacuum molding each of fore and aft decks from a single sheet of plastic with edge flanges along the sides of the deck; securing the deck pieces to the hull with plastic joining means with the deck flanges overlaying the top side edge flanges of the hull; molding a unitary plastic cockpit structure including imperforate structure for cooperating with the hull and the fore deck and the aft deck to enclose the hollow spaces between the two decks and the hull fore and aft of the cockpit area; sealingly securing the cockpit structure to and between the two decks and to the inner surface of the hull and to the top side edges of the hull disposed between the two decks with plastic joining means to completely seal the fore and aft hollow spaces as water tight compartments.

28. The method of making a boat as defined in claim 27, including the steps of securing, by plastic bonding, frames to connect between the hull and deck at a plurality of locations along the length of the boat.

29. A small boat comprising: a slim shallow hull; at least two major deck portions; a cockpit structure; joining means securing said deck pieces to said hull in a watertight manner; joining means securing said cockpit structure to said hull and said deck pieces in a watertight manner; and rigid outrigger structure carrying pontoons, extending from each side of said cockpit structure, each outrigger structure including at least three rods structurally independent of said cockpit structure and plural fastening means rigidly secure one end of all said rods of each outrigger structure to said cockpit structure at widely spaced apart locations in a triangular pattern and other fastening means rigidly secure the other ends of all said rods of each outrigger structure in closely adjacent arrangement.

30. A small boat as defined in claim 29, wherein each outrigger structure includes means for rigidly securing the associated pontoon at two longitudinally spaced locations in operative assembly.

31. A small boat as defined in claim 30, wherein each said pontoon is made from foam plastic.

32. A small boat as defined in claim 30, wherein each said pontoon is molded from foam plastic and has embedded therein during the molding operation, at least two rigid attachment brackets spaced apart fore and aft; and at least two attachment means, separately fastened on said two brackets, secure each pontoon to its associated outrigger structure.

33. A watertight boat as defined in claim 30, wherein provision is made in each said outrigger structure for reception of an oarlock.

References Cited

UNITED STATES PATENTS

| | | | |
|---|---|---|---|
| 609,956 | 8/1898 | Brosnihan | 9—7 |
| 1,889,368 | 11/1932 | Messenger | 9—6 |
| 2,376,753 | 5/1945 | Bowen | 9—6 |
| 3,133,294 | 5/1964 | Kunz | 9—6 |
| 3,150,386 | 9/1964 | Bastien | 9—6 |
| 3,315,284 | 4/1967 | Ludlow | 9—6 |

FOREIGN PATENTS

| | | | |
|---|---|---|---|
| 960,061 | 4/1950 | France | 9—7 |

MILTON BUCHLER, Primary Examiner

C. A. RUTLEDGE, Assistant Examiner